Oct. 15, 1940.  J. F. ANDERSON  2,217,720
APPARATUS FOR SOLVING SEISMOGRAPHIC PROBLEMS
Filed Sept. 19, 1939
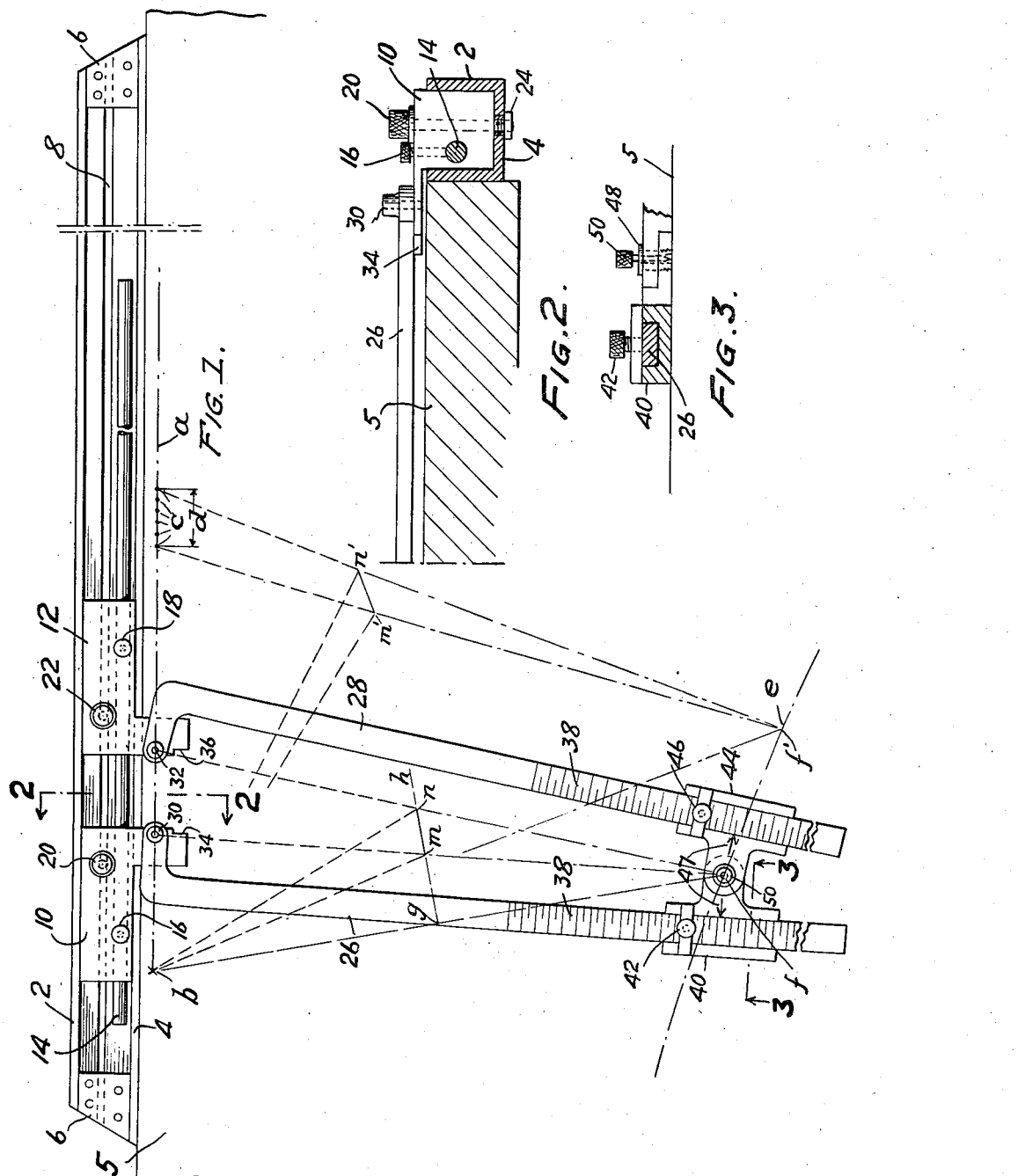
WITNESS:
INVENTOR
John F. Anderson
BY
ATTORNEYS.

Patented Oct. 15, 1940

2,217,720

UNITED STATES PATENT OFFICE 2,217,720

APPARATUS FOR SOLVING SEISMOGRAPHIC PROBLEMS

John F. Anderson, Beaumont, Tex., assignor to Sun Oil Company, Philadelphia, Pa., a corporation of New Jersey Application September 19, 1938, Serial No. 230,598

4 Claims. (Cl. 33—76)

This invention relates to an apparatus for solving graphically problems arising in seismographic prospecting.

In seismographic prospecting by the so-called reflection method a charge is set off at or near the surface of the ground and the arrival of reflected waves is recorded by means of instruments located at varying distances from the shot. In general, such work is carried out in a systematic fashion so as to make the interpretation of results comparatively easy and consequently rather well defined arrays of the receiving instruments are provided. For example, for the obtaining of one set of readings a line is laid out through the location of the shot and the instruments are placed at evenly spaced intervals along such line. Six instruments might be located at equal intervals over a spread of 2,000 to 3,000 feet for one shot and then the whole set moved further along the line to equally spaced positions for succeeding shots. From the delays in times of arival of characteristic impulses, which may be regarded as reflections, as the distances from the shot point increase there may be deduced the approximate depths of the reflecting boundaries and deductions may also be made of the probable slopes of such boundaries.

To make proper deductions there is generally first secured by refraction shooting, or by velocity measurements made in wells or by other methods known to those skilled in the art, a normal depth velocity curve for the region so that, knowing the total delay between the time of the shot and the arrival at one of the grouped instruments there may be deduced the approximate depth of the reflecting boundary.

It is rather difficult to make deductions of slope from the results thus secured, as will be obvious from a consideration of the graphical construction which would have to be made to duplicate the results given by the instrument hereafter described; and it is the object of the present invention to facilitate the graphical solution of the problem of determining the locations and slopes of the reflecting boundaries. By the use of the improved apparatus, the results given by the seismographs may be readily translated into a graph of the boundaries.

The objects of the invention will become more apparent from the following description, read in conjunction with the accompanying drawing in which:

Figure 1 is a plan view of the apparatus shown applied to the edge of a drawing board;

Figure 2 is a vertical section taken on the plane indicated at 2—2 in Figure 1; and Figure 3 is a vertical section taken on the plane indicated at 3—3 in Figure 1.

The device comprises a head formed of two angles 2 and 4 joined by members 6 at their ends and providing a slot 8 between them. The head thus formed is adapted to be located along the edge of a drawing board indicated at 5. Slidably mounted within the channel formed by the members 2 and 4 are blocks 10 and 12, provided with bores arranged to receive a rod 14 of a length greater than the maximum spacing, on the graph, of the detecting stations. It may be noted that the head of the apparatus may be quite long so as to permit the construction of graphs of considerable size and that the rod 14, shown broken in Figure 1, may also be of quite substantial length.

The blocks may be locked to the rod 14 by means of set screws 16 and 18. The blocks are also adapted to be locked to the head by means of screws 20 and 22 extending downwardly through the slot 8 and threaded into nuts 24 provided with squared shanks fitting within the slot 8 so as to prevent their turning therein. It will be obvious, therefore, that if the two blocks 10 and 12 are secured to the rod 14 they may be slid lengthwise as a unit in the head upon release of the screws 20 and 22, and may be secured in any desired position by clamping one or both of these screws. The spacing between the blocks may be altered as desired by freeing the set screws 16 and 18 and relatively sliding the blocks on the rod 14.

Pivoted to the blocks 10 and 12, respectively, at 30 and 32 are arms 26 and 28. The centers of the pivots 30 and 32 are equally spaced from the edge of the head which engages the drawing board and are, therefore, adapted to slide along a zero depth line indicated at $a$. For reference purposes, notches 34 and 36 are provided in the blocks 10 and 12 to indicate accurately the spread of the pivots 30 and 32.

The arms 26 and 28 are graduated as indicated at 38 in terms of depth. These arms may be of considerable length, sufficient to correspond to the deepest reflecting boundaries which may be expected to be considered.

Mounted on the arm 26 is a slide 40 adapted to be clamped in position thereon by means of a screw 42, and on the arm 28 there is a corresponding slide 44 adapted to be clamped thereto by a screw 46. These slides carry zero index markings 47 adapted to be read against the scales 38. The two slides are pivoted together by means of a bushing 48, preferably provided with a center hole in which there may be located a pointed pin 50 which may be pressed downwardly to make a mark in the graph at desired times.

In the use of the apparatus the shot point may be represented on the zero depth line $a$ at, say, $b$, and the receiving instruments by points such as $c$. These may be grouped, for example, as indicated in Figure 1 to form a "spread" delineated by the downwardly drawn lines spaced as indicated at $d$. If this spread is used constantly for a whole set of readings, the blocks 10 and 12 are adjusted on the rod 14 so that the spacing between the pivots 30 and 32, i. e., between the edges 34 and 36 will correspond to the extent of this spread, which as indicated above, may be of the order of 2,000 to 3,000 feet. With this adjustment having been made, the edge 34 may be lined up with the end instrument of the spread nearest the shot point and the edge 36 with the end instrument of the spread furthest from the shot point, and the blocks then located in position in the head. The screws 42 and 46 are then freed and the slide 40 is adjusted along the arm 26 until its index mark 47 is adjacent the calculated travel distance of a reflection recorded by the instrument nearest the shot point, and the slide 40 is then clamped on the arm 26. The arms 26 and 28 are then oscillated about their pivots 30 and 32 until the mark 47 on the slide 44 is in line with the value on arm 44 corresponding to the calculated travel distance of the same reflection farthest from the shot point. The slide 44 is then locked and the pin 50 depressed to form a puncture in the graph sheet. The procedure just described is then repeated for other reflections recorded with the same shot point and recording set-up. Following this the clamp screws 20 and 22 may be freed and the assembly moved to the position of other instruments on which records were made using the same shot point and the process repeated. The same process may also be repeated for different shot points and different instrument set-ups, the spacings between the paths 30 and 32 being adjusted if necessary.

It is obvious that a systematic use of the instrument makes it possible to chart a large amount of observational data within a short period of time. It will be noted that the arms 26 and 28 are respectively parallel to lines joining the pivot 30 and the pin 50 and the pivot 32 and the pin 50. The instrument can be used with the shot point on either side of the recording instrument.

The significance of what is done by the use of the instrument may be best made clear by considering what is produced when there is a single shot point at $b$ and a number of instrument set-ups along the line $a$. Suppose that with this shot point and a series of instrument set-ups along the line $a$ the marks of the pin 50 lie at various points along a line such as $e$. Consider first the significance of the mark made at $f$, the position of the pin 50 illustrated in Figure 1. If perpendicular to the line at its center $g$ there is erected a perpendicular to $bf$ as indicated at $gh$, then the lines drawn from pivot 30 to 50 and 32 to 50, respectively, will intersect $gh$ at $m$ and $n$, respectively, the points at which reflection took place to give rise to the observed data on the assumption that the reflecting points lay in a perpendicular plane through the shot point and the instruments. This assumption is, of course, always made preliminarily. The significance of the point $f$, it will be readily seen, is that it is the image point of the shot point with respect to the points 30 and 32. The line $mn$ then represents the portion of the reflecting boundary from which the particular reflection occurred. By taking account of other image points such as $f'$, other portions of the boundary such as $mn$ from which reflections occurred may be determined. The complete trace of the reflecting boundary in the perpendicular plane through the shot point and the instruments will then be the locus defined by the lines such as $mn$ and $m'n'$. Some correction may, of course, have to be made if other arrays of the instruments indicate that the boundary sloped in a direction transverse to the vertical plane through the shot point and the instruments.

The apparatus, of course, does not plot automatically all of this data, but serves to give readily the image points such as $f$ which, to those skilled in the art, give very considerable information.

What I claim and desire to protect by Letters Patent is:

1. Apparatus for the solution of problems arising in seismographic prospecting comprising means providing a track, a pair of slide members movable along the track, means for maintaining said slide members in fixed relation to each other during such movements, an arm pivoted to each of said slide members and adapted to extend over a surface to which said track is parallel, and means adjustably pivotally joining said arms in converging relationship.

2. Apparatus for the solution of problems arising in seismographic prospecting comprising means providing a track, a pair of slide members movable along the track, an arm pivoted to each of said slide members and adapted to extend over a surface to which said track is parallel, elements adjustable along said arms, and means for pivotally joining said elements.

3. Apparatus for the solution of problems arising in seismographic prospecting comprising means providing a track, a pair of slide members movable along the track, means for maintaining said slide members in fixed relation to each other during such movements, an arm pivoted to each of said slide members and adapted to extend over a surface to which said track is parallel, elements adjustable along said arms, and means for pivotally joining said elements.

4. Apparatus for the solution of problems arising in seismographic prospecting comprising means providing a track, a pair of slide members movable along the track, an arm pivoted to each of said slide members and adapted to extend over a surface to which said track is parallel, means adjustably pivotally joining said arms, and means for marking on said surface the point at which said arms are pivotally joined.

JOHN F. ANDERSON.